United States Patent [19]
Gschlössl

[11] Patent Number: 4,994,725
[45] Date of Patent: Feb. 19, 1991

[54] DRIVE ARRANGEMENT, ESPECIALLY FOR A HOIST MECHANISM

[75] Inventor: Georg Gschlössl, Feldkirchen, Fed. Rep. of Germany

[73] Assignee: MAN GHH Krantechnik GmbH

[21] Appl. No.: 488,717

[22] Filed: Mar. 5, 1990

[30] Foreign Application Priority Data

Mar. 10, 1989 [DE] Fed. Rep. of Germany ....... 3907853

[51] Int. Cl.$^5$ ............................ H02P 5/28; H02P 5/40
[52] U.S. Cl. ..................................... 318/727; 318/757; 318/771; 318/808
[58] Field of Search ............... 318/700, 749, 722, 723, 318/800, 801, 807, 808, 757, 771

[56] References Cited

U.S. PATENT DOCUMENTS

| | | | |
|---|---|---|---|
| 4,110,669 | 8/1978 | Akamatsu | 318/700 |
| 4,160,938 | 7/1979 | Akamatsu | 318/722 |
| 4,761,602 | 8/1988 | Leibovich | 318/749 |
| 4,916,376 | 4/1990 | Kume et al. | 318/771 |

FOREIGN PATENT DOCUMENTS

| | | |
|---|---|---|
| 1067516 | 9/1955 | Fed. Rep. of Germany . |
| 1868379 | 11/1963 | Fed. Rep. of Germany . |
| 1638164 | 1/1968 | Fed. Rep. of Germany . |
| 1814275 | 5/1977 | Fed. Rep. of Germany . |
| 1315589 | 5/1973 | United Kingdom . |

OTHER PUBLICATIONS

Conti Elektro Berichte Apr./Jun. 1960, p. 79.

*Primary Examiner*—William M. Shoop, Jr.
*Assistant Examiner*—John W. Cabeca
*Attorney, Agent, or Firm*—Toren, McGeady & Associates

[57] ABSTRACT

The drive arrangement suitable especially for a hoist mechanism comprises a pole-changing two-speed three-phase motor which is united into one construction unit with a friction brake which can be released by an electromagnet. The two three-phase field windings dimensioned for different pole numbers are connected in star circuit arrangement and have star points conducted out at the motor terminal box of the three-phase motor. The electromagnet of the friction brake is connected through a rectifier circuit arrangement to the star points and when the three-phase motor is switched on is energized by the differential voltage then occurring between the two star points for the release of the friction brake. The rectifier circuit arrangement is accommodated, together with a controllable switch likewise connected to the two star points in the motor terminal box, while the switch path of the controllable switch simultaneously short-circuits the electromagnet on the direct current side, in the switching off of the three-phase motor. The friction brake of the drive arrangement in this way can be controlled from a remotely situated switch or control box containing a direction contactor and a speed contactor, without additional connecting leads being necessary for this purpose beyond the connecting leads in any case necessary for the operation of the three-phase motor.

The arrangement is also suitable in corresponding manner for delta-connection three-phase motors.

6 Claims, 2 Drawing Sheets

DRIVE ARRANGEMENT, ESPECIALLY FOR A HOIST MECHANISM

BACKGROUND OF THE INVENTION

The invention relates to a drive arrangement, especially for a hoist mechanism.

The drive arrangement for the hoist mechanism or the propulsion mechanism of a crane or the like usually comprises a three-phase motor which is united with a friction brake to form a constructional unit. The friction brake is controlled so that it engages under spring loading and brakes the motor shaft, when the three-phase motor is switched off, while the three-phase motor is switched on the friction brake is cleared and releases its shaft. Thus unintended falling of the load of a hoist mechanism or unintended driving of the propulsion mechanism, for example on current failure, are prevented.

In one known drive arrangement the three-phase motor is formed as sliding armature motor, the armature of which is mounted axially displaceably, together with the motor shaft, in the motor housing. The motor shaft carries a brake cone and is stressed axially by a spring into a brake drum, likewise of cone form, fast with the housing. The armature of the motor is likewise of cone form and is pressed by the spring out of the stator opening, which likewise is of cone form. The stator field generated when the motor is switched on draws the armature into the stator opening, whereby the brake cone is released at the same time. The known drive arrangement has the advantage that no additional controlling is necessary for the operation of the friction brake. Admittedly this advantage is gained at the cost of a comparative high construction expense of the sliding armature motor. Furthermore, the conical form of the stator opening necessitates a comparatively large stator diameter, if saturation phenomena of the stator iron are to be avoided. Compared with three-phase current motors with cylindrical armature, sliding armature motors therefore have comparatively large dimensions, which is undesired for a plurality of practical causes.

It is further known to use as hoist mechanism drive a three-phase motor with axially fixed cylindrical rotor and to provide the friction brake, united with the three-phase motor into one unit, with a separate electromagnet which is energized together with the motor and thus releases the brake which is engaged when the motor is switched on. The electromagnet of the brake is energized through a rectifier circuit, which is accommodated in a motor terminal box united with the motor and containing the terminals of the phase windings of the three-phase motor.

In order to render possible two different working speeds of the hoist mechanism, the three-phase motor has a two-speed pole-changing three-phase field winding which is connected through connection leads with a separate, remotely placed control box or switch box. The switch box contains, for the change of direction of rotation of the three-phase motor, at least one rotation direction control contractor which exchanges the phases by pairs in each case, and for the variation of speed of rotation at least one speed control contactor alternately switching on the two field windings, which are dimensioned for different pole numbers. In the known drive arrangement in addition to the rotation direction control contactor and the speed control contactor a brake control contactor is provided in the remote switch box, which through a plurality of connecting leads for the one part connects the alternating current side of the rectifier circuit arranged adjacent to the three-phase motor, with the three-phase current mains and on the other hand is connected with one of its switch contacts on the direct current side in series with the electromagnet of the friction brake. For the controlling of the brake the known drive arrangement thus requires several additional connecting leads between the switch box and the rectifier circuit arranged in the motor terminal box. Since especially in hoist mechanism applications the hoist mechanism is mobile, for example on a crane trolley, over relatively great distances of several tens of meters in relation to the switch box, the connecting leads additionally necessary for the controlling of the brake, between switch box and motor terminal box considerably increase the production expense.

SUMMARY OF THE INVENTION

The invention provides a drive arrangement suitable especially for a hoist mechanism, in which a friction brake connected into one unit with a multispeed pole-changing three-phase motor and releasable by a separate electromagnet can be controlled exclusively through the current supply leads which are necessary in any case for the rotation-direction-reversible and pole-changing operation of the three-phase motor.

The invention adopts the basis that a differential voltage always occurs between corresponding junction points of phase windings of a two-speed three-phase motor, which comprises two three-phase field windings having different pole numbers and connected in a star or delta connection, if one of the two three-phase field windings is switched on through the rotation direction control contactor and the speed control contactor of the switch box. Since the rotation direction control contactor for reversal of direction of rotation merely exchanges two of the three phases, when the motor is switched on not only the phase windings of the three-phase field winding switched on through the rotation direction control contactor, but also one of the phase windings of the other three-phase field winding is connected with the three-phase main. Thus in star connection the star point of the three-phase field winding switched on through the rotation direction control contactor for the motor operation is kept at zero potential and the other star point is kept at the potential of the mains phase. The differential voltage occurring between the star points is utilized for the control of the brake. For this purpose, differently from what is normally usual in three-phase motors of this type, the two star points of the three-phase field windings conducted out into the motor terminal box, and a rectifier circuit and a controllable switch arranged on the motor side is connected with its control terminals to two connection terminals allocated to the star points. The controllable switch is controlled in dependence upon the differential voltage between the two star points and is connected by its switch path into the rectifier circuit of the electromagnet of the brake in such a way that the electromagnet is energized when the three-phase motor is switched on, but when the three-phase motor is switched off the electromagnet is separated from the rectifier circuit, for the acceleration of the response of the brake. The switch path of the controllable switch can for this purpose be made as a make-contact element and connected in series with the electromagnet, or it can however be made a break-contact element and connected in parallel with the electromagnet. The controllable switch can be a relay or an electronic switch with the controllable switch expediently accommodated together with the rectifier circuit in the motor terminal box. Corresponding conditions arise in the case of a three-phase field winding in delta connection, for which the same contactor arrangement can be used in the switch box, for the control of the direction of rotation and the speed. The alternating current input of the rectifier circuit and the control input of the controllable switch are here connected between two preferably mutually corresponding connection terminals of the motor terminal box, the mains phase of which can be phase-exchanged by the switch box through the contactor arrangement. In the case of the delta connection too the contactor arrangement ensures that on energization of one of the two three-phase field windings the remaining third terminal, not phase-exchangeable in each case, of the other three-phase field winding is likewise connected with the three-phase mains, in order that a potential difference may be generated between the two field windings for the control of the rectifier circuit and of the controllable switch.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
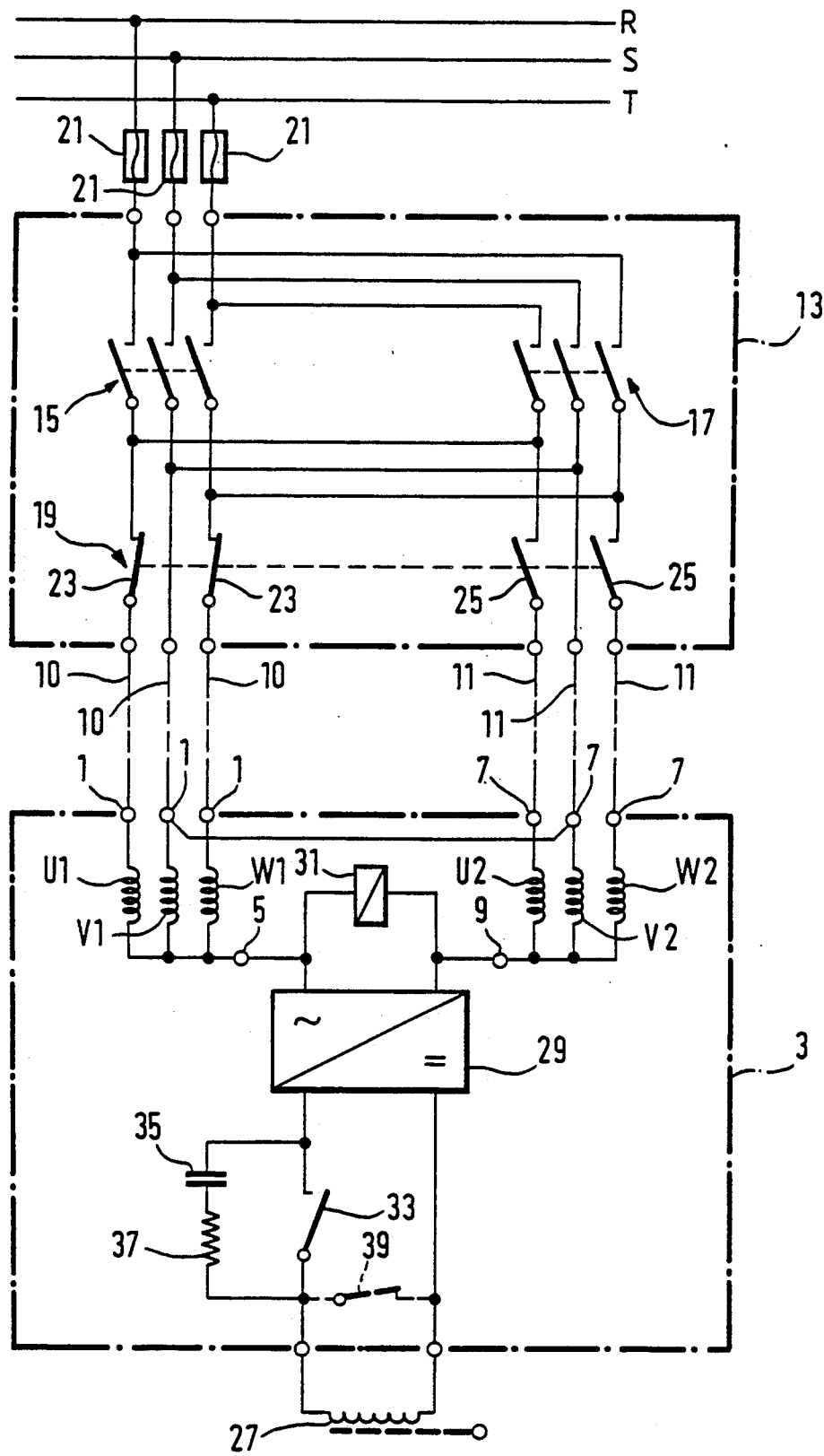
FIG. 1 shows a circuit diagram of a drive arrangement suitable especially for a hoist mechanism with a two-speed three-phase motor in star connection.

The drive arrangement as represented in FIG. 1 comprises a pole-changing three-phase motor (not shown further) with cylindrical rotor, which is connected into one unit with a mechanical friction brake acting upon the motor shaft. The stator of the motor has two three-phase field windings designed for different pole numbers, the phase windings of which designed for the higher pole number and thus lower speed, are designated by U1, V1 and W1, while the phase windings designated by U2, V2 and W2 are allocated to the lower pole number and thus higher speed. The phase windings U1, V1 and W1 are accessible at their one end at connection terminals 1 of a motor terminal box 3, connected into one unit with the three-phase motor, and connected with their other ends to a common star point, which is likewise accessible at a connection terminal 5 of the motor terminal box 3. The corresponding is valid for the phase windings U2, V2 and W2, which are accessible with their one ends at connection terminals 7 of the motor terminal box 3 and with their other ends, which are connected to a star point, at a common connection terminal 9 of the motor terminal box 3. The phase windings are connected through connection leads 10, 11 with a switch box or control box 13 arranged remote from the three-phase motor, which contains a forward control contactor 15, a reverse control contactor 17 and a speed control contactor 19. The control box 13 is connected through fuses 21 with a three-phase current main R, S, T. The forward control contactor 15 and the reverse control contactor 17 are connected before the speed control contactor 19 and in each case switch all three phases, in order to be able, in the state of rest, to keep the connection leads 10, 11 to the motor junction box 3 without current. The switch contacts of the control contactors 15, 17 are connected in parallel with one another on the output side, in relation to mutually corresponding phases U1, U2 or V1, V2 and W1, W2, while the switch contacts are connected on the input side by phases with one another, with phase exchanging of the phases U1, W2 and W1, U2 With regard to the phases V1 and V2, the control contactors 15, 17 merely form on and off switches, by way of which the phases V1, V2 can be disconnected from the mains. Incidentally the phases V1, V2 are connected directly, that is without connection through a further switch contact of a contactor, with the control contactors 15, 17.

The speed control contactor 19 has switch contacts lying in series with the phase-exchangeable phases U1, W1 and U2, W2, of which the switch contacts of the phases U1, W1 for the slower speed are formed as normally closed break contacts 23 and the switch contacts of the phases U2, W2 are formed as normally open make contacts 25. By closure of the switch contacts of the forward control contactor 15 or of the reverse control contactor 17 the three-phase motor is switched on at slow speed in the selected direction of rotation. If additionally the speed control contactor 19 is actuated, then a switch-over is effected in the selected direction of rotation from the slow speed to the fast speed.

The friction brake acting upon the motor shaft is stressed by a spring or the like (not further illustrated) into its position braking the motor shaft. By energization of an electromagnet 27 the brake is released during the motor operation. The electromagnet 27 is connected through a rectifier circuit 29 to the connection terminals 5, 9, allocated to the two star points, within the motor terminal box 3. The two connection terminals 5, 9 are free from current and voltage as long as none of the control contactors 15, 17 is switched on. The electromagnet 27 is thus current-free and the brake is engaged. If one of the control contactors 15 or 17 is actuated, then zero potential lies on the star point of the switched-on phases, by reason of the symmetry conditions of the phase voltages, while the other star point, merely connected through the phase V with the three-phase current mains, is situated at a potential $\sqrt{3}$. In the case of a three-phase current mains with 380V phase voltages thus when the three-phase motor is switched on there is a difference voltage of 220 V between the two star points, which is used through the rectifier circuit 29 for the energization of the electromagnet 27.

In order to achieve the quickest possible response of the friction brake after the switching off of the three-phase motor, parallel with the alternating current side of the rectifier circuit 29 a relay 21 is connected with its energizing winding to the two connection terminals 5, 9 allocated to the star points. The relay 31 has a make contact 33, which is connected in series with the electromagnet 27 to the direct current side of the rectifier circuit 29. When the three-phase motor is switched on the energizing winding of the relay 31 is energized and the contact 33 is closed for the energization of the electromagnet 27. On switching off of the three-phase motor the contact 33 opens and thus provides for a rapid break-down of the magnetic field of the electromagnet 27. A series RC network consisting of a capacitor 35 and a resistor 37 is connected in parallel with the contact 33, for the damping of an occurring opening spark. The relay 31 can have a normally closed break contact 39 instead of the series-connected make contact 33. The contact 39 is connected in parallel with the electromagnet 27 and opens when the three-phase motor is switched on. On switching off of the three-phase motor the contact 39 closes and forms a short-circuit to the electromagnet 27, whereby again the magnetic field is broken down rapidly.

The relay 31, the rectifier circuit 29 and the RC network are expediently likewise accommodated in the motor terminal box 3. In place of the relay 31 it is also possible for an electronic switch, for example a thyristor switch or the like, to be provided.

Figure 2:
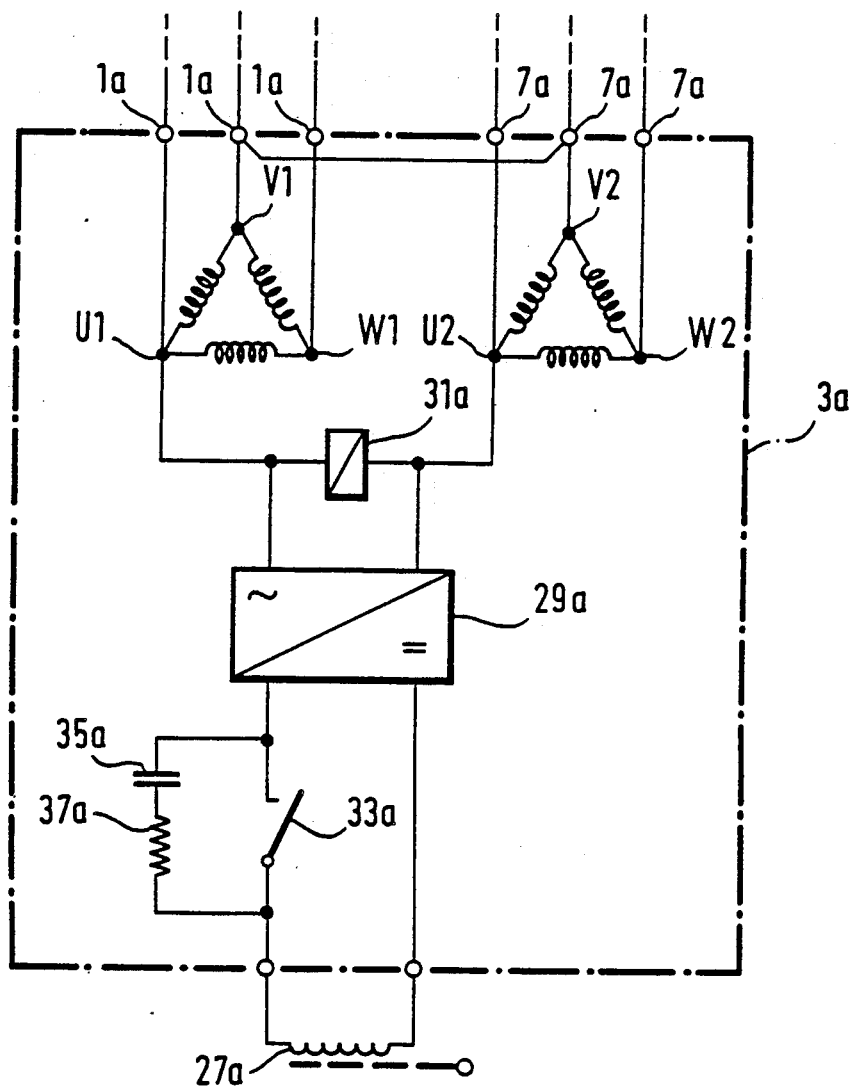
FIG. 2 shows a circuit variant for a delta-connected two-speed three-phase motor usable in the circuit according to FIG. 1.

FIG. 2 shows a variant of the drive arrangement for a pole-changing three-phase motor with cylindrical rotor and friction brake acting mechanically upon the motor shaft, but the three-phase field windings of which are connected in delta connection. FIG. 2 shows only the circuit arrangement on the motor side, since the circuit arrangement of the control contactors on the switch box or control box side corresponds to the circuit arrangement according to FIG. 1. Components or like effect are provided in FIG. 2 with the reference numerals of FIG. 1 and with the letter a for distinction. For the explanation of the function and manner of operation reference is made to the description of FIG. 1.

The phase windings of the three-phase field windings are again designated by U1, V1 and W1 for the field winding designed for the higher pole number and thus lower speed, while the phase windings of the higher speed field winding with lower pole number are designed by U2, V2 and W2. The designations are entered in FIG. 2, in order to facilitate comparison with FIG. 1, on the delta points of the three-phase field windings connected respectively with the connection terminals 1a and 7a of the motor box 3a. In conformity with FIG. 1, the delta points U1 and W1 for the one part and U2 and W2 for the other are the delta points phase-exchangeable for the reversal of rotation, while the delta points V1 and V2 are connected, through the rotation direction control contactor, on energization of one of the two three-phase field windings, in each case in common with the pertinent mains phase.

The electromagnet 27a is again energized through a rectifier circuit 29a, the alternating current side of which is connected to the delta points U1 and U2. Furthermore again a controllable switch, here in the form of a relay 31a, is connected with its control input to the delta points U1 and U2. The relay contact 33a formed as make contact is again connected in series with the electromagnet 27a to the direct current side of the rectifier circuit 29a. The series connection of a capacitor 35a and a resistor 37a is connected in parallel with the contact 33a. In place of the series contact 33a it is also possible, analogously with FIG. 1, for a shunt contact formed as break contact to be provided. The rectifier circuit 29a and the relay 31 are controlled in corresponding manner in dependence upon the potential difference between the delta points U1 and U2. If both field windings are switched off, then the potential difference between the delta points U1 and U2 is zero. If one of the two field windings, for example the field winding U1, V1, is energized, then a difference voltage occurs between the delta points U1 and U2, since the delta point V2 of the unenergized field winding is connected likewise with one phase of the three-phase mains through the rotation direction control contactor of the control box arranged remote from the motor terminal box 3a. The differential voltage is utilized for the energization of the electromagnet 27.

While specific embodiments of the invention have been shown and described in detail to illustrate the application of the inventive principles, it will be understood that the invention may be embodied otherwise without departing from such principles.

What I claim is:

1. A drive arrangement, especially for a hoist mechanism, comprising: a three-phase motor having at least two three-phase field windings dimensioned for different pole numbers, each of the field windings having phase windings (U1, V1, W1, U2, V2, W2) connected with one another in star or delta connection and to connection terminals (1, 7; 1a, 7a) for the connection of three mains phases in a motor terminal box (3; 3a) forming one unit with the three-phase motor; a control box (13) separate from the three-phase motor, which box contains, for variation of direction of rotation of the three-phase motor at least one rotation direction control contactor (15, 17) exchanging the mains phases on a first and a second of the connection terminals of said two three-phase field windings by pairs and for variation of speed of rotation of the three-phase motor at least one speed control contactor (19) connecting in the three-phase field windings alternately, said control box (13) being connected through mutually separate leads (10, 11) with the connection terminals (1, 7; 1a, 7a) of the phase windings (U1, V1, W1, U2, V2, W2) in the motor terminal box (3; 3a) and at least on energization of one of the two three-phase field windings, said control box (13) is connecting a third of said connection terminals of each of the two three-phase field windings in common with the associated mains phase, a friction brake connected into one unit with the three-phase motor and braking a motor shaft of the three-phase motor in the rest condition, which brake can be released by an electromagnet (27; 27a) during motor operation; a rectifier circuit arrangement (29, 29a) arranged adjacent to the three-phase motor, said rectifier circuit arrangement having its alternating current input coupled to the control box (13) and its direct current output to the electromagnet (27; 27a); and a controllable switch (31, 33, 39; 31a, 33a) coupled to the electromagnet for controlling of direct current supplied thereto, wherein in the case of three-phase field windings connected in star connection, connection terminals (5, 9) in the motor box (3) are also allocated to star points of the two three-phase field windings and the rectifier circuit arrangement and the controllable switch (31, 33, 39) with its control input are connected to the star point connection terminals (5, 9) and the controllable switch is controllable in dependent upon a differential voltage between the two star points or wherein in the case of three-phase field windings connected in delta connection the rectifier circuit arrangement (29a) and the controllable switch (31a, 33a) with its control input are connected between phase-exchangeable connection terminal of the two three-phase field windings and the controllable switch is controllable in dependent upon a differential voltage between these two connection terminals.

2. A drive arrangement according to claim 1, wherein the controllable switch (31, 33, 39; 31a, 33a) is accommodated together with the rectifier circuit arrangement in the motor box (3).

3. A drive arrangement according to claim 1, wherein the controllable switch is formed as relay (31; 31a).

4. A drive arrangement according to claim 1, wherein the controllable switch is formed as an electronic switch.

5. A drive arrangement according to claim 1, wherein the controllable switch (31, 33) comprises a switch path (33) connected in series with the electro-magnet (27) and is closed in the case of a differential voltage deviating from zero.

6. A drive arrangement according to claim 1, wherein the controllable switch (31) comprises a switch path (39) connected in parallel with the electro-magnet (27) and is open in the case of a differential voltage deviating from zero.

* * * * *